No. 728,521. Patented May 19, 1903.

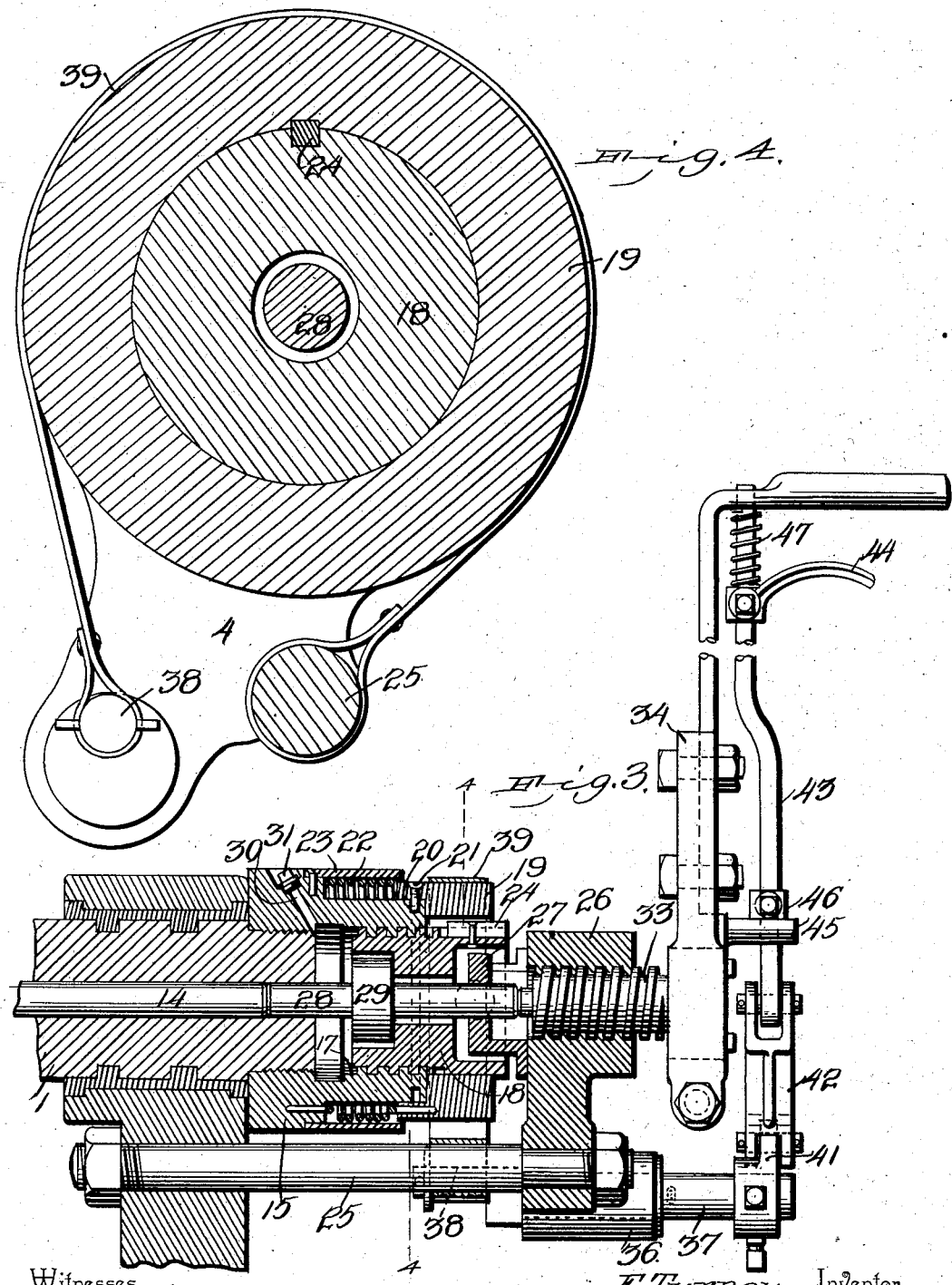

UNITED STATES PATENT OFFICE.

EDWARD TURNEY, OF PORTLAND, OREGON.

CLUTCH-OPERATING MECHANISM.

SPECIFICATION forming part of Letters Patent No. 728,521, dated May 19, 1903.

Application filed August 5, 1902. Serial No. 118,547. (No model.)

*To all whom it may concern:*

Be it known that I, EDWARD TURNEY, a citizen of the United States, residing at Portland, in the county of Multnomah and State of Oregon, have invented a new and useful Clutch-Operating Mechanism, of which the following is a specification.

My invention relates to certain improvements in mechanism for adjusting friction-clutches to operative or inoperative positions, and while applicable to clutches of various type is designed more especially for use in connection with a friction-clutch of the character illustrated in Letters Patent of the United States No. 680,900, granted to me on August 20, 1901.

One of the principal objects of the invention is to provide for the automatic adjustment of the several parts to operative position after the disengagement of the clutch.

A further object of the invention is to reduce the friction by allowing all of the strain to be taken up by the shaft when the clutch is engaged; and still further objects are to improve the construction of the device in such manner as to bring it more completely under the control of the operator and to provide for such adjustment of the parts after each disengagement of the clutch as will enable the clutch to be engaged almost instantly after a disengaging movement.

With these and other objects in view the invention consists in the novel construction and arrangement of parts hereinafter described, illustrated in the accompanying drawings, and particularly pointed out in the appended claims.

In the drawings, Figure 1 is a side elevation of a clutch-operating mechanism constructed and arranged in accordance with my invention, illustrating the application of the device to a friction-clutch of the type employed in connection with winding-drums. Fig. 2 is an end elevation of the clutch-operating mechanism drawn to an enlarged scale. Fig. 3 is a longitudinal sectional elevation of the clutch-operating mechanism. Fig. 4 is a transverse sectional elevation of the same on the line 4 4 of Fig. 3 and drawn to an enlarged scale.

Similar numerals of reference are employed to indicate corresponding parts throughout the several figures of the drawings.

Referring to Fig. 1 of the drawings, 1 designates a shaft carrying a spool or winding-drum 2, said shaft being adapted to suitable bearings 3, carried by the frame or bed of the engine, a portion of which is indicated at 4. The shaft is provided near one end with a clutch-disk 5, having a laterally-projecting beveled flange or rim 6, and the spool or drum is provided with a flange 7, which is adapted to frictionally engage the flange or ring 6 when the spool or drum is moved outward against the tension of the coiled compression-spring 8, and thereby lock the spool or drum to the shaft 1 and cause its rotation with said shaft.

The shaft 1 is provided with an axial bore or passage 9 in its inner end and with a transverse or diametral slot 10, which communicates with the outer end of said bore. In said slot 10 is fitted a transversely-disposed plate 11, which has a longitudinal movement in said slot and is provided at its extremities with lugs fitting over one end of a sleeve or collar 12. The sleeve or collar 12 is loose on the shaft 1 and is adapted to move longitudinally on said shaft and to bear against the inner end of the drum or spool 2. In the bore 9 of the shaft 1 is a longitudinally-movable pin 14, the outer end of which is preferably swiveled or otherwise suitably connected to the plate 11.

The mechanism thus far described is similar to that shown in the Letters Patent hereinbefore referred to and forms no part of the present invention, the structure being illustrated in order to show one application of the clutch-operating mechanism forming the subject of my present invention.

Referring to Fig. 3, 15 indicates a nut which is screwed upon the threaded end of the shaft 1. The nut is provided with a female thread 17, formed in its inner bore and adapted to receive a screw 18, which normally rotates freely with the shaft and nut 15 when the clutching mechanism is in both operative and inoperative positions. On the outer portion of the nut 15 is a revoluble collar 19, the nut being provided with an annular groove 20 for the reception of the inner ends of one or more screws or pins carried by the collar. Between the nut and the collar is a torsion-spring 22, having one end rigidly secured to the nut and the other to the collar, the spring being concealed and protected from injury by a cylindrical casing 23, carried by the nut. The screw 18 revolves with the collar 19, but is free for independent longitudinal movement thereof, independent rotative movement being prevented by a feather or spline 24, secured to the screw 18 and projecting into a keyway in the collar.

Secured to the main frame by a number of bolts 25 is a thrust-nut 26, said nut being provided with a projecting bracket 27, arranged to form an oil-cup and provided with an opening for the reception of one end of a pin 28, the opposite end of which is loosely mounted in the bore 9 of shaft 1 and is adapted to make contact with the longitudinally-movable clutch-operating pin 14. The pin 28 is supported free from the screw 18, the bore of the latter being of sufficient diameter to permit perfect freedom of movement of the pin, and the screw is further provided with an annular recess for the reception of a fixed collar or flange 29, forming a part of the pin 28. As there is considerable friction during the operation of clutching between the pin 28 and the pin 14 and between the collar 29 and screw 18, I provide a passage 30 in the nut 15 in order that the interior of the nut may be supplied with lubricant, the outer end of the passage being normally closed by a threaded plug 31 in order to prevent the escape of lubricant while the nut is rotated.

The thrust-nut 26 is rigidly secured to the fixed frame and is threaded for the reception of a thrust-screw 33, adapted for contact with the outer end of the pin 28. To the projecting end of the thrust-screw is secured a handled operating-lever 34, which may be turned to move the screw inwardly or outwardly in the operation of the clutching mechanism.

The thrust-nut is provided with a bearing 36 for the reception of a shaft 37, having at one end an eccentrically-disposed pin 38, to which is secured one end of a band-brake 39, partly encircling the collar 19 and having its opposite end secured to one of the bolts 25, the arrangement being such that when the shaft 37 is revolved the band-brake will be tightened on the collar 19 and will hold both the collar and the screw 18 from rotative movement. To the outer end of the shaft 37 is secured a rocker-arm 41, which is connected by a link 42 to the lower end of an operating-lever 43, adapted to guideways carried by the main operating-lever and provided with a suitable operating-handle 44. The lower end of the operating-lever is guided in the perforated lug 45, projecting from the lever 34, and on said lever 43 is an adjustable collar or block 46, which rests against the upper surface of the lug and normally maintains the pivotal connection between the lever and link 42 in a plane coincident with the axis of the thrust-screw, so that the turning movement of the latter will not in any manner effect a movement of the arm 41 and brake-operating shaft 37. At the upper portion of the operating-lever is a compression-spring 47, extending between the handle 44 and the handle of the main operating-lever, said spring serving to maintain the collar or block 46 in position against the lug and to return the lever to this position after each operative movement.

When it is desired to engage the winding-drum with the shaft, the operating-lever is turned in such manner as to thrust the screw 33 against the pin 28, the latter being moved against the pin 14. After this movement the handle 44 of the auxiliary lever 43 is raised and the movement is transmitted through the link 42 and arm 41 to the shaft 37. The shaft 37 is rotated to an extent sufficient to clamp the brake-band on the collar 19, thus stopping or retarding the rotative movement of the collar and the screw 18. As the nut 15 continues to rotate with the shaft it will turn on temporarily stationary screw 18 and cause a movement of the latter in the same direction which the pin 28 has been previously moved, the base portion of the recess of the screw 18 coming into contact with the fixed collar 29 of the pin and binding firmly against the same, while the end of the pin 28 is forced tightly against the pin 14 and the latter retained in clutch-engaging position. During this movement the torsion-spring 22 is wound and is maintained in this condition in order that its expansive force may be utilized when it is desired to release the clutch. The operator may then release the brake and restore the thrust-screw to its initial position, the friction between the parts being sufficient to maintain all the members in the position to which they have been adjusted and the screw 18, collar 19, and pin 28 all rotating freely with the shaft 1.

To effect the release of the clutch, it is merely necessary to again turn the thrust-screw in the same direction until the screw engages and forces the pin 28 slightly ahead or to an extent sufficient to reduce the frictional contact between the collar 28 and the screw 18. Immediately this occurs the spring 22 returns to its normal position and turns the collar 19 and screw 18 until both have assumed the initial or inoperative position shown in Fig. 3.

When the shaft 1 is stopped, the clutch may be manually engaged by turning the handle 34 and forcing the thrust-screw forward to cause an engaging movement of the pin 28 with the pin 14, thus placing the drum under the control of the operator during the unwinding of the cable from the drum.

The invention is not limited in its scope to the particular form of clutching mechanism illustrated in Fig. 1, but may be applied to any similar device wherein a longitudinal movement of the pin 14 or an equivalent member is to perform a similar function.

While the construction herein described and illustrated in the accompanying drawings is the preferred form of the device, it is obvious that various changes in the form, proportions, size, and minor details of the structure may be made without departing from the spirit or sacrificing any of the advantages of the invention.

Having thus described my invention, what I claim is—

1. A clutch-operating mechanism comprising a revoluble shaft, a longitudinally-movable clutch-operating member, a nut secured to the shaft, a screw adapted to said nut and normally rotating therewith, means for stopping or retarding the rotation of the screw, and a screw-returning means adjustable to operative position by the movement of the mechanism during the clutching operation for returning the screw to an initial position, substantially as specified.

2. A clutch-operating mechanism comprising a revoluble shaft, a longitudinally-movable clutch-operating member, a nut secured to the shaft, a screw adapted to said nut and normally rotating therewith, means for stopping or retarding the rotation of the screw, and a spring for returning the screw to an initial position.

3. A clutch-operating mechanism comprising a revoluble shaft, a longitudinally-movable clutch-operating member, a nut carried by the shaft, a screw adapted to said nut, means for stopping or retarding the rotative movement of the screw, a flanged pin loosely mounted in the screw and adapted for contact with the clutch-operating member, a thrust-screw for forcing the pin into contact with said clutch-operating member, and means for returning the screw to an initial position.

4. The combination with a shaft, of a longitudinally-movable clutch-operating member, a nut carried by the shaft, a screw adapted to the nut and normally rotating therewith, means for stopping or retarding the movement of the screw, means for returning said screw to initial position, a loosely-mounted pin adapted for contact with the clutch-operating member and having a flanged portion adapted to a recess in the screw, and means for effecting independent movement of the pin to force the clutch-operating member to clutch-engaging position.

5. The combination with a shaft, of a longitudinally-movable clutch-operating member, a nut carried by the shaft, a recessed screw adapted to the nut and normally rotating therewith, a pin extending through the nut and having a fixed flange or collar adapted to the recess, means for effecting an independent movement of the pin into engagement with the clutch-operating member, an auxiliary means for stopping or retarding the rotative movement of the screw, and a spring for returning said screw to initial position after each operation.

6. A clutch-operating mechanism comprising a shaft, a nut carried thereby, a longitudinally-movable clutch-operating member, a screw adapted to the nut and provided with a central recess, a flanged pin extending through the screw and adapted for contact with the clutch-operating member, a thrust-screw for effecting an independent movement of the pin in the direction of the clutch-operating member, a revoluble collar loosely mounted on the nut and feathered to the screw, a braking mechanism for stopping or retarding the movement of the collar, and a spring connecting the nut and collar and serving to return the latter to initial position.

7. A clutch-operating mechanism comprising a shaft, a longitudinally-movable clutch-operating member carried thereby, a nut secured to and rotating with the shaft, a recessed screw carried by the nut, a flanged pin extending through the screw and adapted for contact with the clutch-operating member, a revoluble collar loosely mounted on the nut and feathered to the screw, a torsion-spring connecting the nut and collar, a thrust-screw for forcing the pin into engagement with the clutch-operating member, a brake-band partly encircling the collar, and means for moving the brake-band to collar engaging and releasing positions.

8. A clutch-operating mechanism comprising a revoluble shaft, a longitudinally-movable clutch-operating member, a nut carried by the shaft, a recessed screw adapted to the nut and normally rotating therewith, a collar loosely mounted on the nut and feathered to the screw, a rigid thrust-nut, a flanged pin supported partly by the shaft and partly by the nut, said pin extending through a central opening in the screw and having its flanged portion fitting within the recess therein, a thrust-screw carried by the thrust-nut and adapted to engage the pin, an operating-lever rigidly secured to said thrust-screw, an auxiliary brake-shaft carried by the thrust-nut, a brake-band surrounding the collar and having one end secured to said shaft and the opposite end to a fixed point, and an auxiliary operating-lever for effecting the partial rotation of said brake-shaft, substantially as specified.

9. A clutch-operating mechanism comprising a shaft, a longitudinally-movable clutch-operating member carried by the shaft, a nut secured to the shaft, a screw adapted to said nut and normally rotating therewith, a collar loosely mounted on the nut and feathered to the screw, a torsion-spring connecting the nut and collar, a pin extending through the screw and provided with a flange or collar with which said screw is adapted to come into frictional contact, a thrust-nut, a thrust-screw carried by said nut and adapted to engage the pin, an operating-lever secured to the thrust-screw, a brake-shaft carried by the thrust-nut and provided with an eccentrically-disposed pin, a brake-band partly encircling the collar and having one end secured to the eccentric-pin, an auxiliary operating-lever guided in bearings on the main lever, a rocker-arm secured to the brake-shaft, and a link connecting the rocker-arm to the auxiliary lever, the point of pivotal connection between the link and the lever being normally in a plane coincident with the axis of the thrust-screw.

10. In a device of the class specified, the combination of the shaft, a longitudinally-movable clutch-operating member, a pin adapted to engage and move said member, means for forcing and retaining the pin in clutch-engaging position, said means including a revoluble screw and a collar to which said screw is feathered, a brake-band encircling the collar, a thrust-nut, a thrust-screw carried by the nut and adapted to engage the pin, an operating-lever rigidly secured to the thrust-screw, a brake-shaft carried by the thrust-nut and having one end connected to the brake-band, a perforating guiding-lug 45 carried by the lever, an auxiliary spring-pressed lever extending through the lug, an adjustable collar 46 carried by said lever and adapted to contact with the lug, a rocker-arm secured to the brake-shaft, and a link connecting the rocker-arm to the auxiliary lever, the point of connection between the link and lever being in a plane with the axis of the thrust-screw to thereby permit independent rotative movement of the screw without operating the brake-shaft.

In testimony that I claim the foregoing as my own I have hereto affixed my signature in the presence of two witnesses.

EDWARD TURNEY.

Witnesses:
  H. H. NEWHALL,
  W. J. LYONS.